(12) United States Patent
Overstreet

(10) Patent No.: US 8,619,238 B2
(45) Date of Patent: Dec. 31, 2013

(54) RANGEFINDER FOR SHOOTING DEVICE AND METHOD OF ALIGNING RANGEFINDER TO SHOOTING DEVICE SIGHT

(75) Inventor: Eric T. Overstreet, Lake Oswego, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 12/794,610

(22) Filed: Jun. 4, 2010

(65) Prior Publication Data

US 2011/0222046 A1    Sep. 15, 2011

Related U.S. Application Data

(60) Provisional application No. 61/311,864, filed on Mar. 9, 2010.

(51) Int. Cl.
*G01C 3/08* (2006.01)

(52) U.S. Cl.
USPC ........... 356/4.01; 356/3.01; 356/3.1; 356/4.1; 356/5.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 2,583,260 | A |  | 1/1952  | Felix |
| 3,559,940 | A |  | 2/1971  | Kruzell |
| 3,750,318 | A |  | 8/1973  | Burris |
| 4,317,304 | A |  | 3/1982  | Bass |
| 4,806,007 | A |  | 2/1989  | Bindon |
| 5,068,968 | A |  | 12/1991 | Sillery |
| 5,280,332 | A | * | 1/1994  | Tocher et al. ................. 356/3.15 |
| 5,392,521 | A | * | 2/1995  | Allen ............................... 33/293 |
| 5,435,068 | A | * | 7/1995  | Thames et al. ................... 33/265 |
| 5,479,712 | A |  | 1/1996  | Hargrove et al. |
| 5,495,675 | A | * | 3/1996  | Huang ............................. 42/115 |
| 5,669,173 | A |  | 9/1997  | Rodney, Jr. |
| 5,680,725 | A |  | 10/1997 | Bell |
| 5,914,775 | A |  | 6/1999  | Hargrove et al. |
| 6,073,352 | A | * | 6/2000  | Zykan et al. ..................... 33/265 |
| 6,397,483 | B1 | * | 6/2002  | Perkins ........................... 33/265 |

(Continued)

FOREIGN PATENT DOCUMENTS

| EP | 0 718 585 A1 | 6/1996 |
| JP | 61-179414 A | 8/1986 |
| WO | WO 97/00419 A1 | 1/1997 |

OTHER PUBLICATIONS

Product literature page for AN/PSQ-23, Insight Technology.

(Continued)

*Primary Examiner* — Luke Ratcliffe
(74) *Attorney, Agent, or Firm* — Marger Johnson & McCollom PC

(57) ABSTRACT

Embodiments of the present concept are directed to a rangefinder that can be aligned to a fixed sight on a shooting device so that a range can be accurately taken that corresponds to a fixed sight that is used to align the shooting device to a target. Other embodiments of this concept provide methods of aligning the rangefinder to the fixed sight of the shooting device.

22 Claims, 5 Drawing Sheets

(56) References Cited

U.S. PATENT DOCUMENTS

| | | | |
|---|---|---|---|
| 6,598,333 B1 | 7/2003 | Randazzo et al. | |
| 6,601,308 B2 | 8/2003 | Khoshnood | |
| 6,725,854 B1 * | 4/2004 | Afshari | 124/87 |
| 6,807,742 B2 | 10/2004 | Schick et al. | |
| 6,822,791 B2 | 11/2004 | Recknagel | |
| 7,082,690 B1 * | 8/2006 | Khoshnood | 33/265 |
| 7,296,358 B1 * | 11/2007 | Murphy et al. | 33/265 |
| 7,434,773 B1 * | 10/2008 | Minjares | 248/181.1 |
| 7,574,810 B1 | 8/2009 | LoRocco | |
| 7,603,804 B2 | 10/2009 | Zaderey et al. | |
| 7,654,029 B2 | 2/2010 | Peters et al. | |
| 2003/0086165 A1 | 5/2003 | Cross et al. | |
| 2008/0231829 A1 * | 9/2008 | Hinchliff et al. | 356/4.01 |
| 2009/0293855 A1 * | 12/2009 | Danielson et al. | 124/87 |
| 2010/0115778 A1 * | 5/2010 | Gorsuch et al. | 33/265 |

OTHER PUBLICATIONS

Product literature page for ATPIAL, Insight Tech-Gear.

* cited by examiner

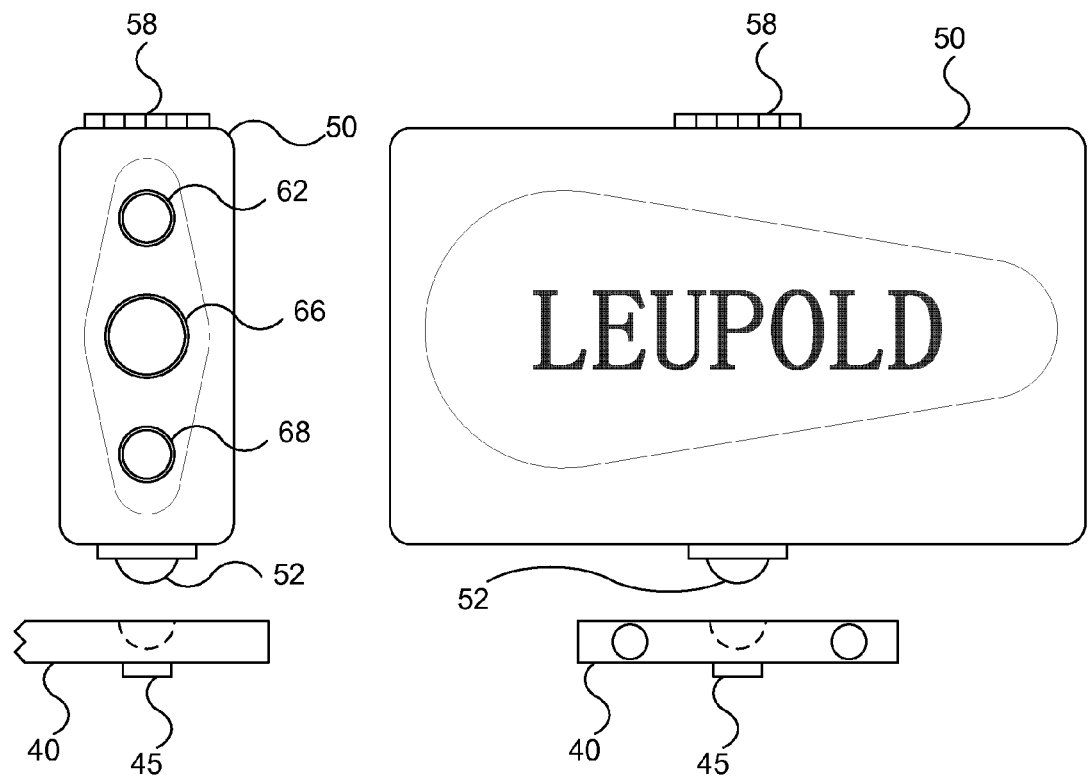

RANGEFINDER FOR SHOOTING DEVICE AND METHOD OF ALIGNING RANGEFINDER TO SHOOTING DEVICE SIGHT

RELATED APPLICATIONS

This application claims the benefit of priority to U.S. Provisional Patent Application No. 61/311,864, filed Mar. 9, 2010, entitled "RANGEFINDER FOR SHOOTING DEVICE AND METHOD OF ALIGNING RANGEFINDER TO SHOOTING DEVICE SIGHT," the contents of which are hereby incorporated by reference.

FIELD OF THE INVENTION

This disclosure relates generally to rangefinders, and more particularly to rangefinders used with shooting devices to accurately measure distances to a target.

BACKGROUND

Rangefinders are used in many contexts to determine distances between two points. Typically, rangefinders are used to measure a distance between an observer and a target point. There are various methods used to estimate or determine this distance based on several different measurement principles. Some rangefinders, such as stadimeters and sextants, use angle measurements between the top and bottom of the target device to estimate a distance range to the target object. Other rangefinders use optical principles to merge two images of a target object from two lenses by using a mechanical or electronic dial. These rangefinders generally measure the degree of rotation of prisms used in the lens to determine the distance to a target object and include coincidence and stereoscopic rangefinders. For more precise range measurements, active rangefinders can be used, which operated my measuring the time it takes a transmitted energy pulse directed at the target to be reflected back and received at the rangefinder. These active types of range finders may use lasers, sonar, or radar as the transmitted energy pulse. Laser rangefinders tend to be the most common of these active rangefinders because of the accuracy and size afforded by these devices.

Laser rangefinders are used often in the military and sports to measure the distance to a desired target. When used on a shooting device, some of these rangefinders use ballistic adjustment features to compensate for changes in elevation between a shooter and a target. One such rangefinder is disclosed in U.S. Pat. No. 5,914,775 (the '775 patent), issued Jun. 22, 1999 to Hargrove et al. The ballistically adjusted rangefinder disclosed by the '775 includes an angle sensitive transducer and a programmed data processor to calculate the distance to a target. However, once a range is determined by the '755 patent, the patent discloses a moveable sight indicator that moves via a linear actuator to provide a sighting mechanism to correspond to the determined range. This extra movement adds additional complexity over traditionally fixed sights, as well as requiring extra time to become positioned that may let a moving target move outside of a previously determined range by the time the sight is correctly positioned.

BRIEF DESCRIPTION OF THE DRAWINGS

FIG. 2A is a front view of a rangefinder and mounting apparatus shown in FIG. 1 according to embodiments of the invention.

FIG. 2B is a side view of a rangefinder and mounting apparatus shown in FIG. 1 according to embodiments of the invention.

DETAILED DESCRIPTION

Embodiments of the present concept are directed to a rangefinder that can be aligned to a fixed sight on a shooting device so that a range can be accurately taken that corresponds to a fixed sight that is used to align the shooting device to a target. Other embodiments of this concept provide methods of aligning the rangefinder to the fixed sight of the shooting device. As used herein, a fixed sight refers to an apparatus mounted on the shooting device that is used for aligning the shooting device to a target such that a projectile shot from the shooting device strikes the target. This sight is referred to as being "fixed" because the sight does not change between shots or movement of the shooting device without being adjusted by the shooter or another person. That is, the fixed sight may be adjusted relative to the shooting device by the shooter or another person, but can be locked into a desired position and maintain that position during use of the shooting device.

The rangefinder of the invention can be used with any of a variety of shooting devices, from archery equipment, to hand-held guns, to rifles, and to even firearms mounted to vehicles or stationary objects. Each of these shooting devices includes a type of fixed sight used by a shooter to align the shooting device to a target. In the following described embodiments, the rangefinder is discussed as attached to a bow used to shoot arrows. Archery equipment such as the bow and arrow discussed may be especially suited to the rangefinder of this concept because arrows trajectory tends to be much more non-linear over relatively short distances than bullets or other projectiles shot from firearms. Thus, a correct alignment of a rangefinder may be more critical in archery sports and hunting for short distance shots. Other embodiments of this invention, however, may use the rangefinder with other types of shooting devices using similar features and principles to those discussed below.

Figure 1:
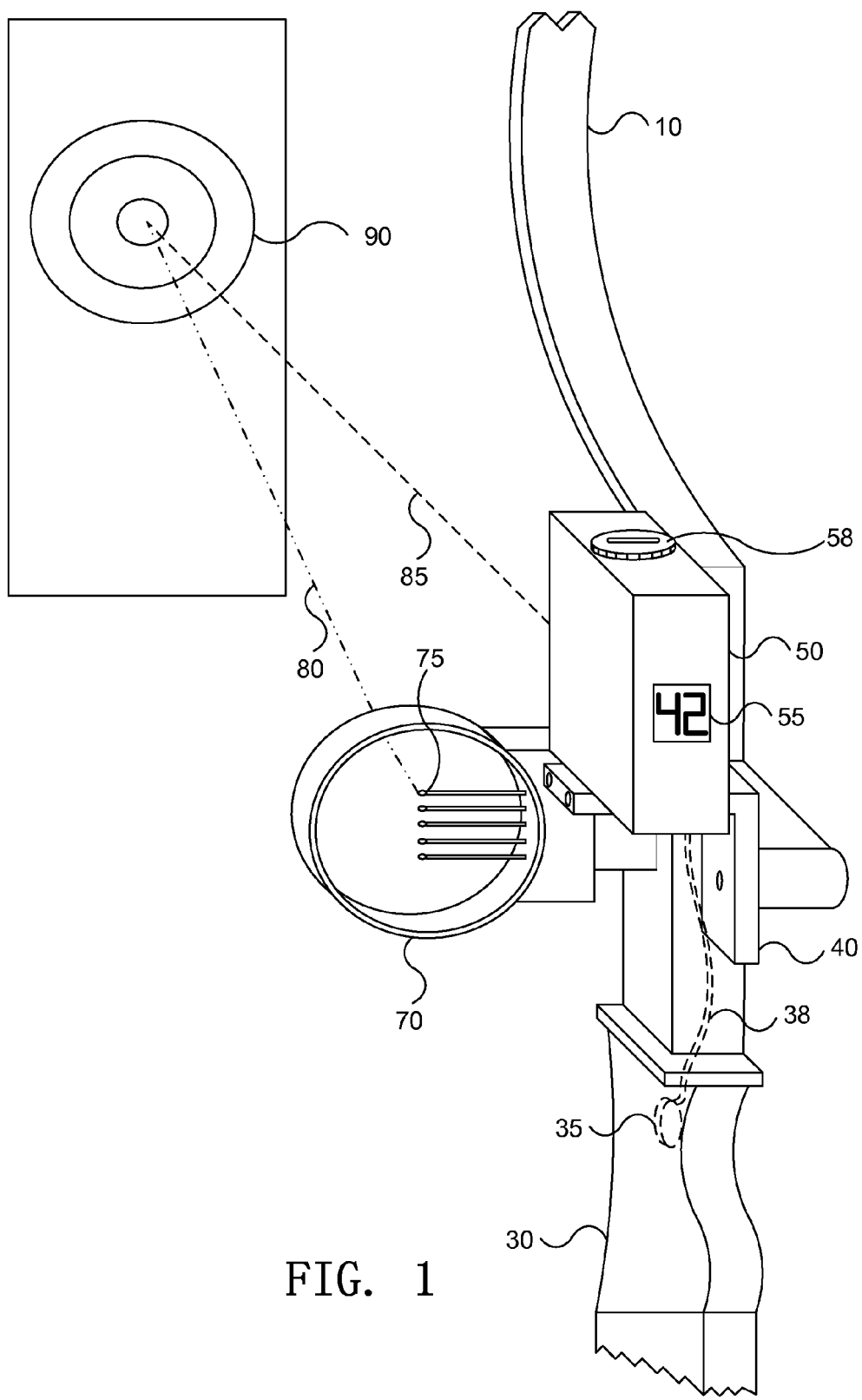
FIG. 1 is an isometric diagram of a rangefinder mounted on an archery bow according to embodiments of the invention.

FIG. 1 is an isometric diagram of a rangefinder mounted on an archery bow according to embodiments of the invention.

Referring to FIG. 1, a rangefinder 50 is mounted to a bow 10 through a mounting mechanism 40. The mounting mechanism 40 may include a lightweight bracket made of a rigid material such as aluminum, carbon fiber, or the like that can be attached to the frame of the bow 10. The mounting mechanism 40 also includes a connector 52 (see FIGS. 2A and 2B) that allows the rangefinder 50 to be moved relative to the bow 10. In some embodiments, such as those shown in FIGS. 2A and 2B, the connector 52 includes a universal ball joint positioned under the housing body of the rangefinder 50 that allows the rangefinder to be moved in any direction relative to the bow 10. In other embodiments, the mounting mechanism 40 may include tilt or slide adjustment components to allow the rangefinder 50 to be moved relative to the bow 10.

The rangefinder 50 may also include a battery compartment 58 that allows for field changing of a battery while maintaining a water tight seal. For example, the battery compartment 58 may include a screw-type cap that uses an integrated seal (not shown) to prevent water from entering the housing of the rangefinder 50 when installed. The rangefinder 50 may use a CR-2 or other long lasting battery to power the range finding circuitry (not shown) located inside the rangefinder. The housing or body of the rangefinder may be constructed out of a lightweight rigid material, such as aluminum, carbon fiber, polycarbonate, or other similar material.

To display a measured range, the rangefinder includes a range display 55 oriented toward the shooter. The range display 55 may be an light emitting diode (LED) display, liquid crystal display (LCD), or other display type capable of showing a measured range to the shooter. The rangefinder 50 may also include an ambient light sensor (not shown) that determines the optimum brightness needed for the range display to clearly show the range without wasting power or being distracting to the shooter. The range measurement shown on the range display may be altered to show the range in various units, such as yards, meters, feet, etc.

The rangefinder 50 may also include a pressure pad activator 35 that can be used by the shooter to activate the rangefinder 50 so that it measures and displays a range to the target. The pressure pad activator 35 may be mounted to the housing of the rangefinder 50 or may be located remotely from the housing of the rangefinder 50 so that it can be conveniently activated without a shooter having to remove her hands from the shooting device. In the embodiment illustrated in FIG. 1, the pressure pad activator 35 is mounted on a grip area 30 of the bow 10 so that a shooter may use her index finder to press the pressure pad activator and get a measured range to be displayed on the range display 55. The pressure pad activator 35 may be mounted to the bow 10 with a light adhesive or small fastener so that it can be removed with the rangefinder if needed. Alternatively, the pressure pad activator 35 may be attached to the grip area 30 of the bow 10 with grip tape or other means not directly applied between the pressure pad activator and the bow.

Here, the pressure pad activator 35 is connected to the rangefinder 50 through a small cable 38. The cable 38 may transmit an electronic signal from the pressure pad activator 35 to the rangefinder 50 when the shooter presses the pressure pad activator. In other embodiments, the pressure pad activator 35 may transmit and activation signal wirelessly to the rangefinder 50 or by other communication means. The pressure pad activator 35 may be pressed multiple times to cycle through a variety of range-finding options, such as static range measurement, scan mode, etc., as well as turning the rangefinder 50 off when it is not in use. The pressure pad activator 35 may include a multi-input device, such as a toggle switch, etc. to allow the shooter to directly activate a desired feature of the rangefinder 50.

The bow 10 also includes a ring sight 70 with one or more range pins 75 to allow the bow to be aligned to a target. When multiple range pins 75 are used, each range pin is set to align the bow 10 to a target at a different distance. For example, a top pin may be aligned to a target at 20 yards; the second pin may be aligned to a target at 30 yards; etc. In some embodiments, each range pin uses a fiber optic point to allow the end of the pins to be colored with a different color to help quickly differentiate the pins. For example the first, third, and fifth pin ends may be colored with a red color, while the second and fourth pin ends are colored with a green color. The range pins 75 are fixed pins that may be adjusted by a shooter when she is calibrating the position of each pin for a specific target distance. Once calibrated and adjusted, the range pins 75 may be locked into their respective positions for use in practice, competition, or sport. Various other configurations and features relating to the ring sight 70 and range pins 75 are possible and are well known in the art.

To align the rangefinder 50 to a fixed sight (i.e., one of the range pins 75) on the shooting device (i.e., the bow 10), a shooter may measure a shooting distance from the shooting device 10 to a target 90. The shooter may then line up the desired fixed sight 75 (here the top range pin) to the target 90. If the rangefinder 50 is being calibrated to the topmost pin as shown here in the embodiment illustrated in FIG. 1, the shooter may make sure the measured distance to the target is 20 yards, for instance. The shooter may then activate an alignment mechanism (discussed below) on the rangefinder 50 to provide an indication of the alignment of the rangefinder. Next, the shooter may maneuver the rangefinder 50 relative to the bow 10 using the mounting apparatus and/or connector to align the rangefinder to the sighted target 90 using the alignment mechanism.

FIG. 2A is a front view of the rangefinder and mounting apparatus shown in FIG. 1 according to embodiments of the invention. FIG. 2B is a side view of a rangefinder and mounting apparatus shown in FIG. 1 according to embodiments of the invention.

Figure 3A:
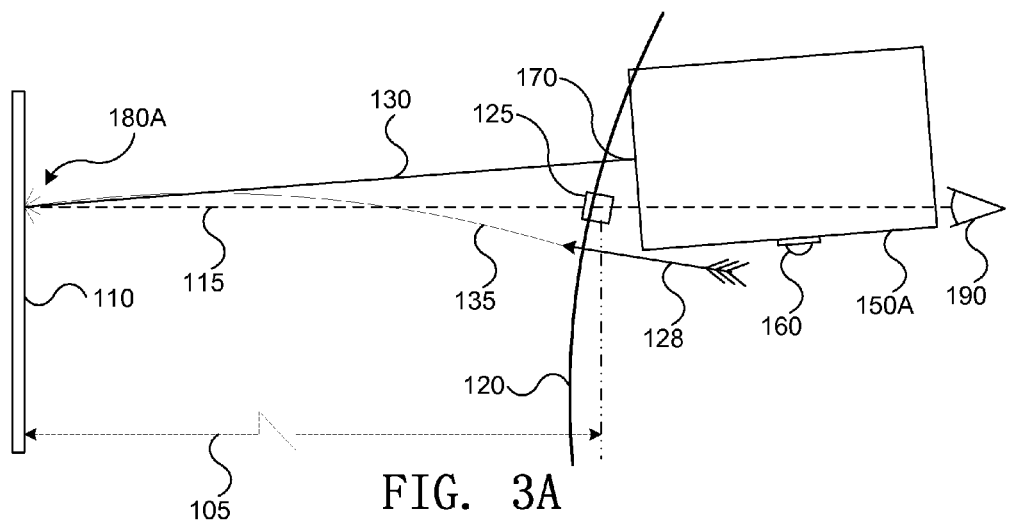
FIGS. 3A, 3B, and 3C are block diagrams of various embodiments of a rangefinder according to embodiments of the invention.
Figure 3B:
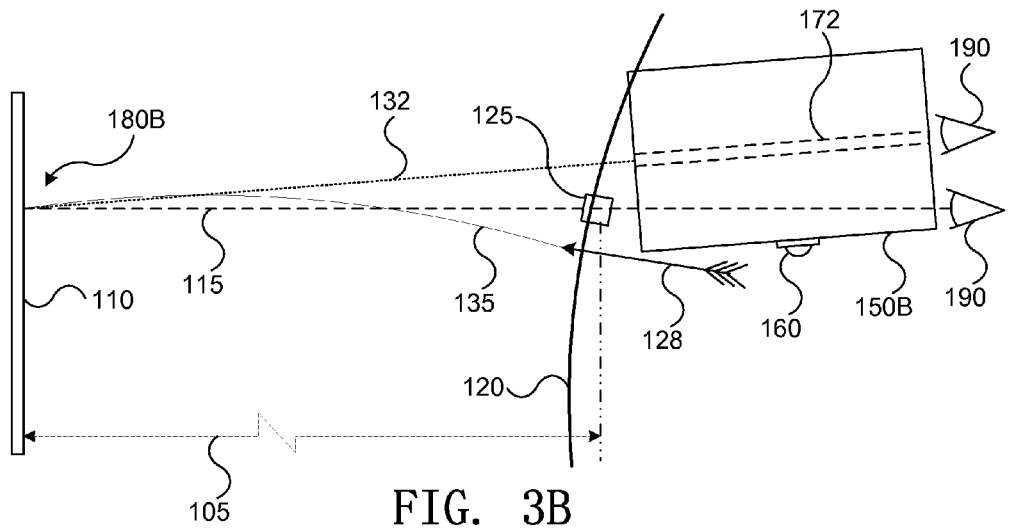
Figure 3C:
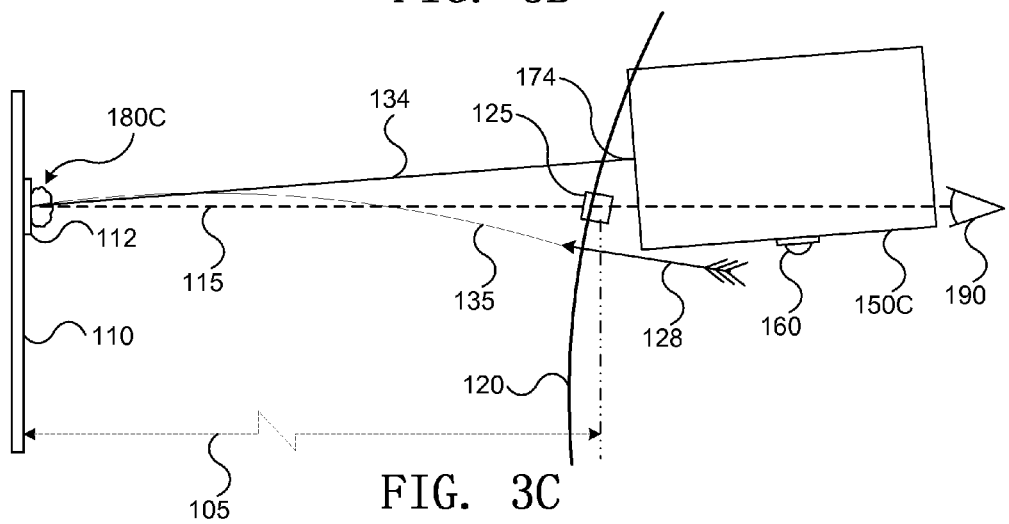

Referring to FIGS. 2A and 2B, the front of the rangefinder 50 includes a beam-transmitting window 62, a beam-receiver window 66, and an alignment mechanism 68. In this embodiment, since the rangefinder 50 is a laser rangefinder, the beam-transmitting window 62 allows a laser pulse to be transmitted toward a target 90 (FIG. 1) while the beam-receiving window 66 allows the reflection of the transmitted laser pulse off of the target to be received so that a point-to-point range calculation can be determined. In other embodiments that use other means of determining a range to a target, different features may be present on the rangefinder 50 to allow for the measurement of the range to the target as is known in the art. The alignment mechanism 68 provides a means to allow the rangefinder 50 to be aligned with a sighted target. In some embodiments, the alignment mechanism 68 is a visible laser beam that displays a visible laser image on the target as shown in FIG. 3A. In other embodiments, the alignment mechanism 68 is a peep tube that allows a shooter to view the sighted target while aligning the rangefinder 50 as shown in FIG. 3B. In yet other embodiments, the alignment mechanism 68 is a infrared beam transmitter that illuminates a phosphor or other light emitting material coated on the target as shown in FIG. 3C. While these three alignment mechanisms are discussed in detail below with respect to FIGS. 3A-3C, other alignment mechanisms exist that allow the rangefinder to be aligned to a target sighted with a fixed sight on a shooting device. These other alignment mechanisms are contemplated and are covered within the scope of this concept.

Also shown in FIGS. 2A and 2B is an example connector 52 that connects the rangefinder 50 to the mounting apparatus 40. Here, the connector 52 includes a universal ball joint 52 that allows the rangefinder 50 to be moved in any direction relative to the shooting device. The connector 52 may include guides (not shown) that limit the motion of the rangefinder 50 in specified directions, such as by restricting movement to a forward and back direction, in some embodiments. The universal ball joint 52 may be structured to maintain some friction with the ball socket to maintain a finer degree of movement control. In addition, the mounting apparatus may include a locking device 45 that allows the ball joint 52, and hence the rangefinder 50, in place relative to the mounting apparatus 40. This locking device may include a screw, pin, or other device that can prevent movement of the connector 52 when activated. Although a universal ball joint 52 is shown as the connector that allows the rangefinder 50 to be moved relative to the shooting device, numerous other methods of providing relative movement between the rangefinder and the shooting device exist including sliding and tilt controls. In addition, in other embodiments, the rangefinder 50 may be fixedly mounted to the mounting device 40 and movement of the rangefinder 50 relative to the shooting device may be accomplished through adjustment mechanisms between the mounting device 40 and the shooting device.

FIGS. 3A, 3B, and 3C are block diagrams of various embodiments of a rangefinder according to embodiments of the invention.

Referring to FIG. 3A, a rangefinder 150A is mounted on a bow shooting device 120 and is aimed at a target 110 that is set at a known distance 105 away from the bow. Here, the bow 120 has had a fixed sight 125 (e.g., a range pin) aligned with target 100. The alignment between the shooter's eye 190, the fixed sight 125, and the target 110 is indicated by the dashed line 115. Note that the bow 120 is actually aimed slightly up so that an arrow 128 shot from the bow would have a slightly upward trajectory to account for gravitational effects that affect the flight path 135 of the arrow. Here, the rangefinder 150A has been adjusted via the connector 160 such that a visible laser alignment mechanism 170 emits a visible laser that follows a path 130 to illuminate and match the sighted point 180A on the target 110. The visible laser alignment mechanism 170 allows the rangefinder 150A to be quickly and easily aligned to a desired fixed sight 125 during setup since it displays a visible indication of its alignment position that remains visible while the rangefinder is maneuvered into an aligned position and locked in place.

In some embodiments that utilize a visible laser as an alignment mechanism 170, the visible laser can be removed so that the rangefinder complies with state hunting laws or other competition laws. Here, the visible laser alignment mechanism 170 may be used to allow the rangefinder 150A to be aligned with the fixed sight 125 of the bow 110 during a setup operation and then removed when the bow with the rangefinder is taken out into the field. In other embodiments, another type of visible alignment indicator may be included in the rangefinder 150A other than a visible laser. It is preferable that these other visible alignment indicators use a relatively-focused visible energy beam so that an orientation of the rangefinder 150A can be easily detected and a precise alignment of the rangefinder can be made. In yet other embodiments, such as those shown in FIGS. 3B and 3C, different alignment mechanisms that do not use a visible alignment indicator may be used with the rangefinder to comply with the above laws.

FIG. 3B is similar to FIG. 3A except that a peep tube 172 is used as the alignment mechanism instead of the visible laser. Here, the shooter again uses the fixed sight 125 to align the bow 110 to the target 110. Then, the shooter uses the peep tube 172 to view the sighted target and thereby align the rangefinder 150B to the fixed sight 125. The peep tube uses a restricted viewing path to narrow a field of view to a specific point as indicated by the dashed view line 132. The peep tube 172 may include a small opening integrated in the rangefinder 150B to allow a shooter 190 to view sighted target 180B through the rangefinder, or may include two or more circles, or a tube attached to a side of the rangefinder 150B that allows for a restricted view of the sighted target 180B.

FIG. 3C is also similar to FIG. 3A except that an infrared beam transmitter 174 is used as the alignment mechanism instead of the visible laser. Here, since the infrared beam 134 is generally invisible to the human eye, the target 110 may be coated with a phosphor or other light emitting material 112 that is a photoluminescence that becomes visible when an infrared beam interacts with it. Since some competition and hunting laws only prohibit visible sighting lasers and devices, the infrared beam alignment mechanism 174 on the rangefinder 150C would still comply with the laws since it is not a visible beam. However, it could still act as a visible beam during an alignment process because of the use of the phosphor material 112. Thus, like the visible laser alignment mechanism shown in FIG. 3A, the infrared beam could be used to illuminate a sighted target 180C so as to align the rangefinder 150C to the fixed sight 125. In other embodiments, energy beams other than an infrared beam may be used that are not visible to the human eye on the rangefinder 150C. These beams are used in conjunction with a corresponding material coated on a target or part of the target that allows for light emission at the point where the energy beam strikes the target. In yet other embodiments, a non-visible energy beam may be included in the rangefinder 150C without a specially coated target. Here, the shooter may use a special viewing device to detect the target location struck by the energy beam during the alignment procedure.

Figure 4A:
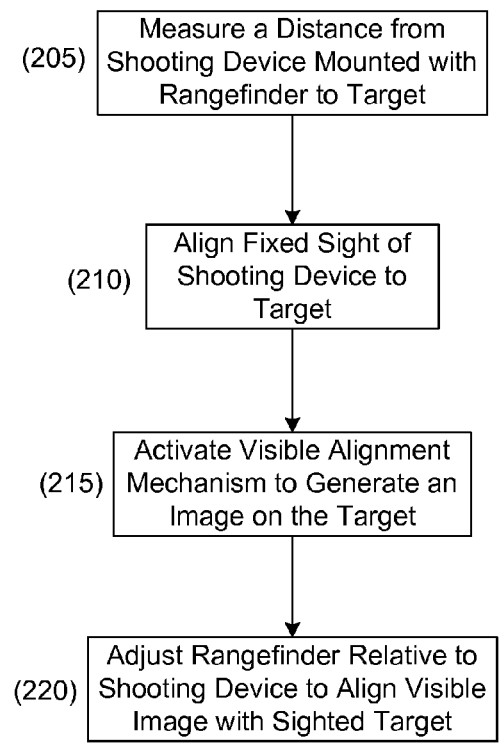
FIGS. 4A, 4B, and 4C are flow diagrams of various embodiments of methods to align a rangefinder according to embodiments of the invention.
Figure 4B:
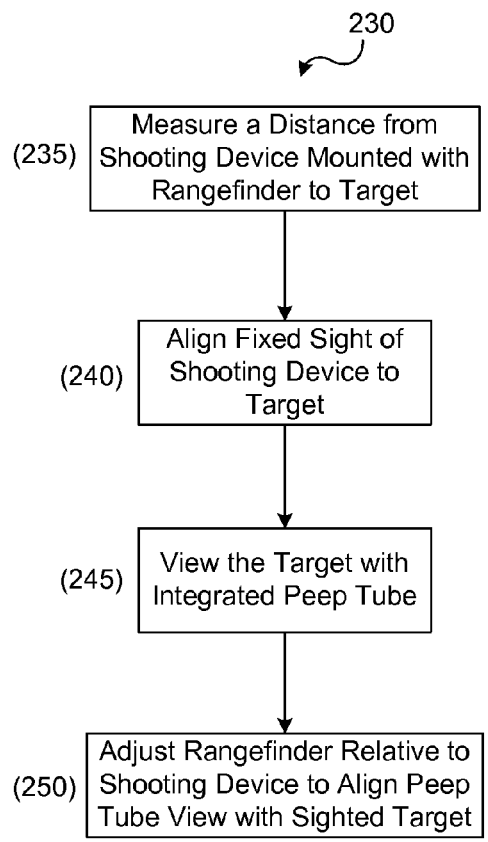
Figure 4C:
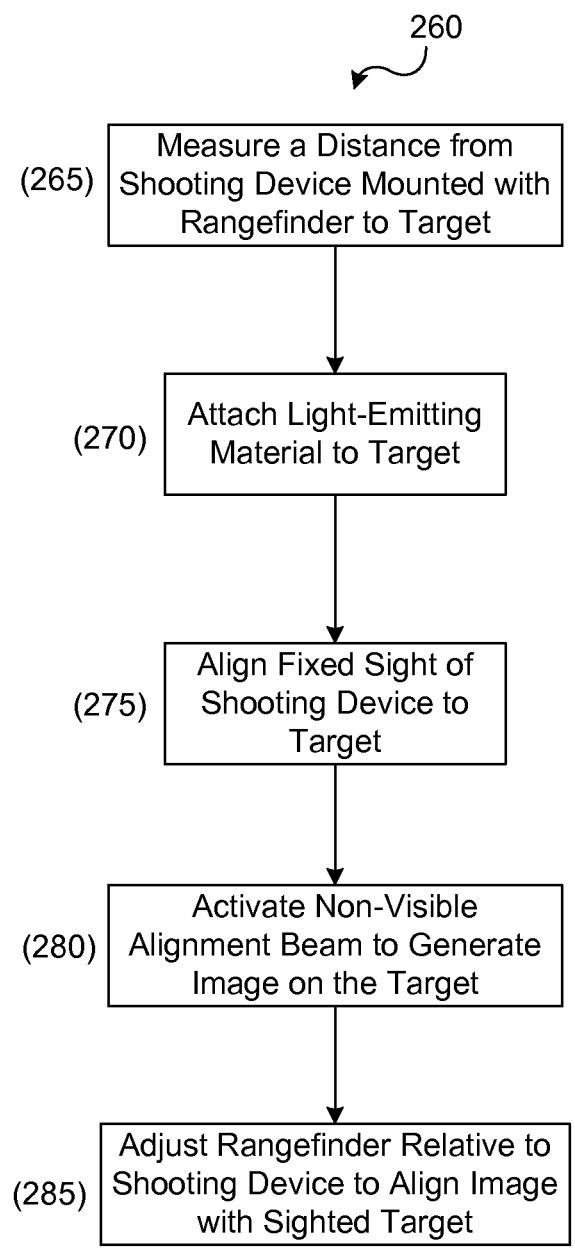

FIGS. 4A, 4B, and 4C are flow diagrams of various embodiments of methods to align a rangefinder according to embodiments of the invention.

Referring to FIG. 4A, flow 200 begins by measuring a distance from a shooting device mounted with a rangefinder to the target in process 205. Next, a fixed sight on the shooting device is aligned to the target in process 210. In process 215, a visible alignment mechanism on the rangefinder is activated to illuminate a target area. As discussed above, this visible alignment mechanism may be a visible laser or other visible energy beam. In embodiments, that include a removable laser or other visible alignment device, the removable alignment mechanism may have to be installed on the rangefinder device and calibrated so that it is correctly oriented toward a similar location as the range-finding energy pulse. Activating the visible energy beam may be accomplished through pressing the pressure pad 35 (FIG. 1) or by manipulating another control switch on the rangefinder. In process 220, the rangefinder is adjusted relative to the shooting device to align the visible alignment mechanism with the sighted target. As discussed above, adjusting the rangefinder may be accomplished by unlocking a locking device 45 (FIG. 2A-2B), moving the rangefinder relative to the shooting device, and re-locking the locking device. Depending upon the embodiment, the rangefinder may be moved relative to the shooting device by altering the position of the rangefinder via a universal ball connector 52 (FIG. 2A-2B), or by manipulating the rangefinder 50 and/or mounting mechanism via tilt controls, slides, shims, gearing, or the like.

Referring to FIG. 4B, flow 230 begins by measuring a distance from a shooting device mounted with a rangefinder to the target in process 235. Next, a fixed sight on the shooting device is aligned to the target in process 240. In process 245, a peep tube alignment mechanism on the rangefinder is used to view a target area. As discussed above, the peep tube alignment mechanism restricts the field of view of the shooter so that the restricted field of view corresponds to the targeted position of the range-finding pulse energy. If the peep tube includes an adjustment mechanism, the adjustment mechanism may further be manipulated to alter the size of the field of view to pin point an aligned location. In process 250, the rangefinder is adjusted relative to the shooting device to align the viewed target though the peep tube with the sighted target. In some embodiments, processes 245 and 250 may be used in an iterative manner to increase the accuracy of the alignment. That is, once the viewed target through the peep hole is matched with the sighted target, the field of view through the peep tube may be further restricted and the rangefinder may again be adjusted so that the restricted-view of the target through the peep tube is again matched to the sighted target.

Referring to FIG. 4C, flow 260 begins by measuring a distance from a shooting device mounted with a rangefinder to the target in process 265. A phosphor material or other light-emitting material is attached to the target in process 270. Next, a fixed sight on the shooting device is aligned to the target in process 275. In process 280, a non-visible beam alignment mechanism on the rangefinder is activated to illuminate a portion of the coated target area. As discussed above, the non-visible beam alignment mechanism may include an infrared beam or other non-visible energy beam that creates a visible spot on the target coating or material. In process 285, the rangefinder is adjusted relative to the shooting device to align the illuminated target portion with the sighted target. This alignment process 285 may be similar to the alignment process 220 discussed above with respect to FIG. 4A. In embodiments that utilize a target already made with a material that emits light when exposed to a non-visible beam generated by the alignment mechanism of the rangefinder, process 270 may be omitted from this method.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A rangefinder for determining a distance between a shooting device and a target, the shooting device including a sighting mechanism for aligning the shooting device to the target, the rangefinder device comprising:
   a housing;
   a mounting apparatus attached to the housing structured to mount the rangefinder on the shooting device, the mounting apparatus including a connector by which the rangefinder can be mounted on the shooting device and adjusted relative to the shooting device after mounting in a manner that is separate from aligning the sighting mechanism of the shooting device to the target; and
   an alignment mechanism on the rangefinder and configured to align the rangefinder to a fixed sight of the shooting device, the alignment mechanism including a visible laser configured to illuminate the target, and the visible laser controllable by an operator to be turned on and turned off.

2. The rangefinder of claim 1, further comprising an activation mechanism configured to activate the rangefinder.

3. The rangefinder of claim 2, wherein the activation mechanism includes a pressure pad activator coupled to the housing through a cable and structured to be mounted on a grip of the shooting device, the pressure pad activator configured to activate the rangefinder in response to applied pressure from a shooter.

4. The rangefinder of claim 1, further comprising an inclinometer configured to measure an elevation angle of the rangefinder.

5. The rangefinder of claim 1, wherein the connector includes a universal ball joint.

6. The rangefinder of claim 5, wherein the connector further includes a locking mechanism to lock the ball joint in a desired alignment position.

7. A method of aligning a rangefinder mounted to a shooting device, the method comprising:
   measuring a distance from the rangefinder to a target;
   aligning a fixed sight of the shooting device to the target;
   activating a visible alignment mechanism of the rangefinder to illuminate a visible image on the target; and
   aligning the rangefinder mounted to the shooting device to center the visible image on the sighted target by adjusting the position of the rangefinder relative to the bow after mounting in a process that is separate from aligning the fixed sight of the shooting device to the target.

8. The method of claim 7, wherein the visible alignment mechanism is a laser.

9. The method of claim 7, further comprising:
   attaching the visible alignment mechanism to the rangefinder; and
   calibrating the visible alignment mechanism to the rangefinder.

10. A method of aligning a rangefinder mounted to a shooting device, the method comprising:
    measuring a distance from the rangefinder to a target;
    aligning a fixed sight of the shooting device to the target;
    viewing the target through a peep tube integrated with the rangefinder; and
    aligning the rangefinder to center the peep tube target view with the sighted target by adjusting the position of the rangefinder mounted to the shooting device relative to the shooting device in a process that is separate from aligning the fixed sight of the shooting device to the target.

11. The method of claim 10 in which adjusting the position of the rangefinder relative to the shooting device comprises manipulating an adjustment mechanism to alter a field of view seen through the peep tube.

12. The method of claim 11, further comprising re-aligning the rangefinder to the sighted target after manipulating the adjustment mechanism.

13. A method of aligning a rangefinder mounted to a shooting device, the method comprising:
    measuring a distance from the rangefinder to a target that includes a material that will emit light when exposed to a non-visible beam;
    aligning a fixed sight of the shooting device to the target;
    activating the non-visible beam on the rangefinder to illuminate an image on the target; and
    aligning the rangefinder mounted to the shooting device to center the illuminated image on the sighted target in a process that is separate from aligning the fixed sight of the shooting device to the target.

14. The method of claim 13, further comprising detecting the illuminate image from the non-visible beam using a viewing device.

15. The method of claim 13, wherein the non-visible beam is an infrared beam.

16. A rangefinder for determining a distance between a shooting device and a target, the rangefinder device comprising:
    a housing;
    a mounting apparatus fixedly attached to the housing and structured to mount the rangefinder on the shooting device, the mounting apparatus including an adjustable rangefinder support structured to allow the rangefinder to be adjusted relative to the shooting device after mounting and set in a fixed position once adjusted; and an alignment mechanism including a beam transmitter configured to align the rangefinder device to a fixed sight of the shooting device and illuminate the target that is separate from a sight alignment system of the fixed sight of the shooting device.

17. The rangefinder of claim 16, further comprising a pressure pad activator coupled to the housing through a cable and structured to be mounted on a grip of the shooting device, the pressure pad activator configured to activate the rangefinder in response to applied pressure from a shooter.

18. The rangefinder of claim 16 in which the adjustable rangefinder support comprises a ball joint.

19. The rangefinder of claim 16 in which the beam transmitter is structured to generate a visible laser beam.

20. The rangefinder of claim 16 in which the beam transmitter is structured to generate a non-visible beam, and in which the target includes a material selected to generate a visible response in response to being receiving the non-visible beam.

21. The rangefinder of claim 16 in which the alignment mechanism is structured to be turned off while the rangefinder is still operational.

22. The rangefinder of claim 16 in which the alignment mechanism is removable from the rangefinder.

\* \* \* \* \*